United States Patent Office 3,350,455
Patented Oct. 31, 1967

3,350,455
METHOD FOR THE PREPARATION OF ALIPHATIC DIAMINES
Robert W. White, Willingboro, N.J., and Joseph L. O'Brien, Southampton, Pa., assignors to Rohm & Haas Company, Philadelphia, Pa., a corporation of Delaware
No Drawing. Filed Apr. 8, 1965, Ser. No. 446,704
5 Claims. (Cl. 260—585)

This invention deals with a method for the preparation of aliphatic diamines for aliphatic nitriles. It also deals with a method for producing aliphatic diamines wherein useful monoamine by-products are also formed.

The aliphatic nitriles employed in the present process may be represented by the formula

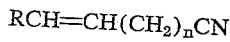

wherein $n$ is an integer of 7 to 11 and
R stands for hydrogen, alkyl of 1 to 10 carbon atoms, alkenyl of 2 to 8 carbon atoms and alkdienyl of 4 to 8 carbon atoms. It is preferred to have $n$ represnt 7 and for R to represent naturally-occurring groups, such as those found oleic, linoleic and linolenic structures.

Typical nitrile reactants include olenonitrile, linoleonitrile, linolenonitrile, decenenitrile, undecenenitrile, dodecenenitrile, palmitoleonitrile, eiscosenonitrile, cetoleonitrile and eruconitrile.

The process of the present invention involves essentially three steps. The first step involves the ozonization of the defined unsaturated aliphatic nitrile, followed by reductive amination of the ozonide formed. The ozonization is conducted by passing ozone into an alkanolic solution of the stated unsaturated aliphatic nitrile. The alkanols employed are those containing from 1 to 8 carbon atoms and may be primary, secondary or tertiary alkanolic structures. Typically, one may employ methanol, ethanol, n-butanol, t-butanol, n-propanol, isopropanol, hexanol or t-octanol. The ozonization is conducted at reaction temperatures of about —40° C. to about +40° C., preferably 0° to 20° C. The ozone reacts at all double bonds present in the reactant and, therefore, the molar ratio of ozone to nitrile will be based on the number of double bonds in the nitrile. There is required one molar equivalent of ozone for each double bond present.

At the conclusion of the ozonization, the formed ozonide is reductively aminated by first reacting the ozonide with one molar equivalent of hydrogen for each double bond in the original nitrile reactant. This reaction is conducted in the presence of nickel, cobalt or rhodium hydrogenation catalysts, such as the typical Raney nickel or Raney cobalt. The reaction temperature is maintained at about —40° C. to about +50° C., preferably about 0° C. to about 20° C., at a hydrogen pressure of about 50 to 500 p.s.i.g., preferably 50 to 200 p.s.i.g. The reaction with the hydrogen can be followed by observing the exothermic heat of reaction. When this subsides, the hydrogen has reacted essentially completely.

After the reaction with hydrogen, there is introduced ammonia and this amination step is conducted in the presence of hydrogen at a temperature of about 50° to 350° C., preferably 60° to 100° C. Pressures in the range of 300 to 3000 p.s.i.g., preferably 400 to 800 p.s.i.g., are employed. The amination is also conducted in the presence of a hydrogenation catalyst, as defined previously.

The principal diamine product of the present invention will contain from 9 to 13 carbon atoms since the specific structure of the diamine product is determined by the nature of the value of $n$ in the original nitrile reactant. The process of this invention, as an ultimate consideration, results in a 9 to 13 carbon atom saturated aliphatic diamine and other amine products, depending on the nature of the R group, previously defined. When R is hydrogen, then, in addition to the diamine formed, there is obtained methylamine. When R represents alkyl, the monoamine product will vary from ethylamine to undecylamine. When R represents an alkenyl group, there are then obtained three products, the principal diamine, a low molecular weight diamine, depending on the location of the double bond in the alkenyl representation of R, and a monoamine whose nature is also depending on the position of the double bond in R. For instance, when the original nitrile reactant is linoleonitrile, the products are diaminononane, diaminopropane and aminohexane. Furthermore, when R represents an alkdienyl group, there are then obtained four products—a diaminoalkane, two smaller molecular weight diaminoalkanes and a monoaminoalkane, again depending on the location of the two double bonds within the group, R. For instance, in the reaction involving linolenonitrile, there are obtained diaminononane, two equivalents of diaminopropane and monoaminopropane. In this instance, while there are actually four products, two of them are the same because of the rather symmetrical disposition of the double bonds. In all instances, the products are separable by conventional techniques. The catalyst is first removed by filtration or similar method and then the amino products can be separated by distillation. The process is characterized by high reproducibility of results, good yields of high purity products. The amino products are known compounds that are then available for use in many known ways.

This invention may be more fully understood by the following illustrative examples.

*Example 1*

A solution of 263 g. (1 mole) of oleonitrile, dissolved in 500 ml. of methanol, was treated at 10° C. with 1 mole of ozone, delivered as a 2% stream in oxygen. The resulting solution was charged to a stirred autoclave and 15 g. of Raney nickel catalyst was added. The autoclave was flushed with hydrogen and pressurized to 400 p.s.i.g. The initial reduction was carried out at 0° to 10° C. until the pressure drop indicated 1 mole of hydrogen was absorbed. The second portion of the reduction was carried out at 800 p.s.i.g. and 80° to 95° C. after addition of 100 g. of ammonia. When hydrogen absorption was complete, the autoclave was cooled, the contents were removed and filtered. Distillation of the stripped residue gave 95 g. of nonylamine, B.P. 70° to 75° C. (2 mm. absolute pressure) and 115 g. of nonamethylene diamine, B.P. 98° to 102° C. (1.0 mm. absolute pressure). A small amount of stearylamine was obtained from the residue.

*Example 2*

Into a solution of 165 g. (1 mole) of undecenenitrile in 200 ml. of butanol at 10° C. was passed 48 g. of ozone as a 2.5% stream in oxygen. The clear ozonolysis solution was treated with hydrogen and 98 g. of ammonia as described in Example 1. The reduced solution was filtered and distilled. Methylamine was removed with the butanol solvent and 127 g. of 1,10-diaminodecane was distilled, B.P. 112° to 113° C. (2.5 mm. absolute pressure). This product solidified in the receiver, M.P. 60° to 61.5° C.

*Example 3*

A stream of ozone (2.25%) in oxygen was passed into a solution of 319 g. of eruconitrile in 700 ml. of ethanol at 0° to 5° C. until unsaturation was absent. The solution was charged to a stirred autoclave with 20 g. of Raney nickel and reduced with 400 p.s.i.g. of hydrogen at 0° to 5° C. When the exothermic first-stage reduction was complete, 110 g. of ammonia was added and the reduction was completed at 900 p.s.i.g. of hydrogen at 90° to 100° C. The solution was removed from the autoclave, filtered and the solvent removed at reduced pressure. The products were separated by distillation to give 100 g. of nonylamine and 165 g. of 1,13-diaminodecane, B.P. 150° to 153° C. (1.5 mm. absolute pressure), which solidified on standing, M.P. 50° to 50.5° C.

*Example 4*

Into a solution of 261 g. of linoleonitrile in 500 ml. of methanol was passed 1 mole of ozone as a 2% stream in oxygen. The ozonolysis solution was treated with hydrogen and 150 g. of ammonia, as described in the above examples. Distillation of the products gave 65 g. of hexylamine, 44 g. of 1,3-diaminopropane and 110 g. of 1,9-diaminononane.

*Example 5*

Using the experimental procedure outlined in the preceding examples, a solution of 260 g. of linolenonitrile in 450 ml. of ethanol was treated with 1 mole of ozone, and the resulting solution was reduced with hydrogen and 200 g. of ammonia. The usual workup gave, after removal of solvent and propylamine, 75 g. of 1,3-propane diamine and 105 g. of 1,9-nonane diamine.

*Example 6*

In the same manner described in the preceding examples, 48 g. of ozone was passed into 319 g. of cetoleonitrile in 500 ml. of propanol and the peroxidic solution reduced with hydrogen and 95 g. of ammonia. The products were separated by distillation to give 111 g. of undecylamine and 145 g. of 1,11-diaminoundecane, B.P. 110° to 114° C. (1.5 mm. absolute pressure), which solidified on standing, M.P. 57° to 58° C.

We claim:
1. A method for the preparation of amino compounds comprising reacting with ozone a compound having the formula

$$RCH=CH(CH_2)_nCN$$

wherein $n$ is an integer of 7 to 11 and
R is selected from the class consisting of hydrogen, alkyl of 1 to 10 carbon atoms, alkenyl of 2 to 8 carbon atoms and alkdienyl of 4 to 8 carbon atoms, in the presence of an alkanol containing from 1 to 8 carbon atoms, at a temperature of about −40° C. to about +40° C., followed by reacting the formed ozonide with hydrogen at a temperature of about −40° C. to about +50° C., at a pressure of about 50 to 500 p.s.i.g., and then ammonia in the presence of hydrogen at a temperature of about 50° to 250° C., at a pressure of 300 to 3000 p.s.i.g., the reaction with hydrogen and with ammonia taking place in the presence of a hydrogenation catalyst.

2. The method according to claim 1 in which the reaction with hydrogen is conducted at about 0° C. to about 20° C., at a hydrogen pressure of about 50 to 200 p.s.i.g., and the reaction with ammonia in the presence of hydrogen is conducted at about 60° to 100° C., at a pressure of about 500 to 1000 p.s.i.g.

3. The method according to claim 1 in which the starting nitrile is oleonitrile.

4. The method according to claim 1 in which the starting nitrile is linoleonitrile.

5. The method according to claim 1 in which the starting nitrile is linolenonitrile.

References Cited

Anders et al.: The Journal of the American Oil Chemists' Society, vol. 42, pages 824 to 827.

CHARLES B. PARKER, *Primary Examiner.*

R. L. RAYMOND, *Assistant Examiner.*